United States Patent
Yeh

(10) Patent No.: US 9,164,602 B2
(45) Date of Patent: Oct. 20, 2015

(54) ELECTRONIC DEVICE AND SCREEN CONTENT SHARING METHOD

(71) Applicant: Wistron Corporation, New Taipei (TW)

(72) Inventor: Yu-Ping Yeh, New Taipei (TW)

(73) Assignee: Wistron Corporation, New Taipei (TW)

( * ) Notice: Subject to any disclaimer, the term of this patent is extended or adjusted under 35 U.S.C. 154(b) by 113 days.

(21) Appl. No.: 14/078,542

(22) Filed: Nov. 13, 2013

(65) Prior Publication Data

US 2014/0340308 A1    Nov. 20, 2014

(30) Foreign Application Priority Data

May 16, 2013   (TW) .............................. 102117404 A

(51) Int. Cl.
| | |
|---|---|
| *G06F 3/038* | (2013.01) |
| *G06F 3/041* | (2006.01) |
| *G06F 1/16* | (2006.01) |
| *G06F 1/32* | (2006.01) |
| *G06F 3/14* | (2006.01) |

(52) U.S. Cl.
CPC .............. *G06F 3/038* (2013.01); *G06F 1/1647* (2013.01); *G06F 1/3265* (2013.01); *G06F 3/0412* (2013.01); *G06F 3/1423* (2013.01)

(58) Field of Classification Search
CPC ..... G06F 3/038; G06F 3/0488; G06F 3/0412; G06F 3/1423; G06F 1/1647; G06F 1/1654; G06F 1/3203; G06F 1/3265; H04M 2250/22; H04M 2250/16
See application file for complete search history.

(56) References Cited

U.S. PATENT DOCUMENTS

| | | | |
|---|---|---|---|
| 8,335,539 | B1 | 12/2012 | Wu |
| 8,626,247 | B2 * | 1/2014 | Yoon .............................. 455/566 |
| 2003/0025678 | A1 * | 2/2003 | Lee et al. ........................ 345/173 |
| 2009/0225042 | A1 * | 9/2009 | Andrews et al. .............. 345/173 |
| 2011/0149101 | A1 * | 6/2011 | Kim et al. ................... 348/222.1 |
| 2014/0085197 | A1 * | 3/2014 | Patel .............................. 345/157 |

FOREIGN PATENT DOCUMENTS

| | | |
|---|---|---|
| TW | M419969 | 1/2012 |
| TW | M425328 | 3/2012 |

* cited by examiner

*Primary Examiner* — Larry Sternbane
(74) *Attorney, Agent, or Firm* — Jianq Chyun IP Office

(57) ABSTRACT

An electronic device and a screen content sharing method thereof are provided, adapted for sharing screen content between the electronic device and an external display device. The method includes the following steps. A current screen is displayed. A work mode of the electronic device according to connection status between the electronic device and the external display device is determined. A touch position and a touch mode of a touch action on the touch screen are determined according to the touch action received by the touch screen. A connection management program is executed, and the electronic device is controlled to enter a touch pad projection mode. When the connection management program is executed, the current screen is transmitted to the external display device so as to display the current screen, and a cursor is projected on the current screen displayed by the external display device according to the touch position.

20 Claims, 2 Drawing Sheets

ELECTRONIC DEVICE AND SCREEN CONTENT SHARING METHOD

CROSS-REFERENCE TO RELATED APPLICATION

This application claims the priority benefit of Taiwan application serial no. 102117404, filed on May 16, 2013. The entirety of the above-mentioned patent application is hereby incorporated by reference herein and made a part of this specification.

BACKGROUND OF THE INVENTION

1. Field of the Invention

The invention relates to an electronic device and a control method thereof, and more particularly, to an electronic device having a touch screen, and a screen content sharing method between the electronic device and an external display device thereof.

2. Description of Related Art

In conventional arts, when using tablet computer or touch phone, users may perform bidirectional communication with tablet computer or touch phone by inputting with touch screen and observing changes on touch screen of tablet computer or smart phone with touch panel with their own eyes. In other words, touch actions on tablet computer or smart phone with touch panel is served as input for human-computer interaction, and screen of tablet computer or a touch panel of a smart phone is served as output for human-computer interaction.

When a user intends to playback photos, videos, any format of files, applications or web pages stored on the smart phone with touch panel or the tablet computer, in conventional arts, projecting on a large screen to share said files with the others can be done by utilizing wireless communication technologies. In this case, user of smart phone or tablet computer may input data or instructions by using touch actions (i.e. user placing fingers on touch screen as to input) of smart phone or tablet computer, while having eyes focused at both a position where finger clicks and an external display device (which is an output for touch phone or tablet computer). That is, user must have eyes stared at feedbacks from external display device to confirm whether content on smart phone or tablet computer is correctly projected to big screen of external display device.

This is because that design of operating system in either smart phone or tablet computer does not generate any cursor corresponding to a finger contacting point on screen when touch screen is touched by users' finger, which means that, in most cases, it rely on human eyes to observe movements and position on big screen which are corresponding to movements and clicking of fingers on touch screen. Accordingly, before projection mode is activated by user, finger's movements or most of operating actions on smart phone or tablet computer are not displayed on projected television screen. Therefore, it is foreseeable that user's sight must go back forth between smart phone or tablet computer, which is inconvenience in use.

SUMMARY OF THE INVENTION

The invention provides an electronic device adapted for sharing a screen content to an external display device, which includes a touch screen, a first connection interface, a transceiving unit and a control unit. The touch screen displays a current screen. The first connection interface is connected to a second connection interface of the external display device. The transceiving unit is electrically connected to the first connection interface. The control unit is coupled to the transceiving unit and the touch screen, and configured to determine a touch position and a touch mode of a touch action currently on the touch screen and a work mode of the electronic device respectively according to the touch action being received by the touch screen and a connection status between the first connection interface and the second connection interface. The control unit is further configured to execute a connection management program in which the electronic device enables the work mode into a touch pad projection mode when the connection between the first connection interface and the second connection interface is completed and the connection management program is executed by the control unit; and in the touch pad projection mode, the control unit transmits the current screen to the external display device through the transceiving unit so as to display the current screen, and projects a cursor to be displayed on the current screen displayed by the external display device according to the touch position.

In an embodiment of the invention, the control unit provides a software button as a content sharing activation interface to be displayed on the touch screen when the control unit determines that the connection between the first connection interface and the second connection interface is completed. The control unit controls the electronic device to enable the work mode into the touch pad projection mode when the control unit receives the touch action corresponding to the content sharing action interface from the touch screen.

In an embodiment of the invention, the electronic device provides a physical button as a content sharing activation interface; the control unit enables the physical button to receive an operation signal when the control unit determines that the connection between the first connection interface and the second connection interface is completed; and the control unit controls the electronic device to enable the work mode into the touch pad projection mode when the control unit receives the operation signal.

In an embodiment of the invention, the control unit controls the electronic device to enable the work mode into a touch screen projection mode when the connect ion between the first connection interface and the second connection interface is completed but the connection management program is not activated and executed. In the touch screen projection mode, the control unit transmits the current screen to the external display device through the transceiving unit so as to display the current screen.

In an embodiment of the invention, the control unit automatically activates and executes the connection management program when the control unit determines that the connection between the first connection interface and the second connection interface is completed.

In an embodiment of the invention, the touch mode of the touch action on the touch screen includes a single finger mode, wherein in the single finger mode and when the electronic device is in the touch pad projection mode, a touch on the touch screen is utilized by a single finger, and the touch position of the single finger is a projection position of the cursor on the current screen displayed by the external display device.

In an embodiment of the invention, the touch mode of the touch action on the touch screen includes a two fingers mode, wherein in the two finger mode and when the electronic device is in the touch pad projection mode, a sliding action executed on the touch screen by utilizing two fingers, and the sliding action is a screen dragging with respect to the current screen displayed on the external display device.

In an embodiment of the invention, the control unit controls the touch screen to enable the work mode into a power-saving mode when the electronic device is controlled by the control unit to enter the touch pad projection mode, wherein in the power-saving mode, the current screen is not displayed on the touch screen.

In an embodiment of the invention, the control units controls the electronic device to enable the work mode into an ordinary touch screen mode when the control unit determines that the connection between the electronic device and the external display device is failed or lost, The control unit only displays the current screen on the touch screen in the ordinary touch screen mode.

In an embodiment of the invention, the control unit turns off the power-saving mode so the current screen is displayed on the touch screen when the electronic device exits the touch pad projection mode.

In an embodiment of the invention, the first connection interface of the electronic device and the second connection of the external display device are wired connected or wirelessly connected.

The invention provides a screen content sharing method adapted for sharing a screen content between an electronic device and an external display device, in which the electronic device includes a touch screen, and the screen content sharing method includes the following steps: First, a current screen is display on a touch screen. Then, a work mode of the electronic device is determined according to a connection between the electronic device and the external display device. Next, a touch position and a touch mode of a touch action on the touch screen are determined according to the touch action received by the touch screen. The electronic device is controlled to enable the work mode into a touch pad projection mode if a connection between the electronic device and the external display device is completed and a connection management program is executed. When the connection management program is executed, the current screen is transmitted to the external display device so as to display the current screen, and a cursor is projected on the current screen displayed by the external display device according to the touch position.

Based on above, the invention provides an electronic device and a screen content sharing method, allowing the user to project the content of the electronic device on hand to the big screen of the external display device, so that the user only needs to have eyes focused on the big screen of the external display device while clicking the touch screen of the electronic device so as to correspondingly click on options on the big screen without changing eye sights repeatedly between the electronic device and the external display device.

To make the above features and advantages of the disclosure more comprehensible, several embodiments accompanied with drawings are described in detail as follows.

DESCRIPTION OF THE EMBODIMENTS

Figure 1:
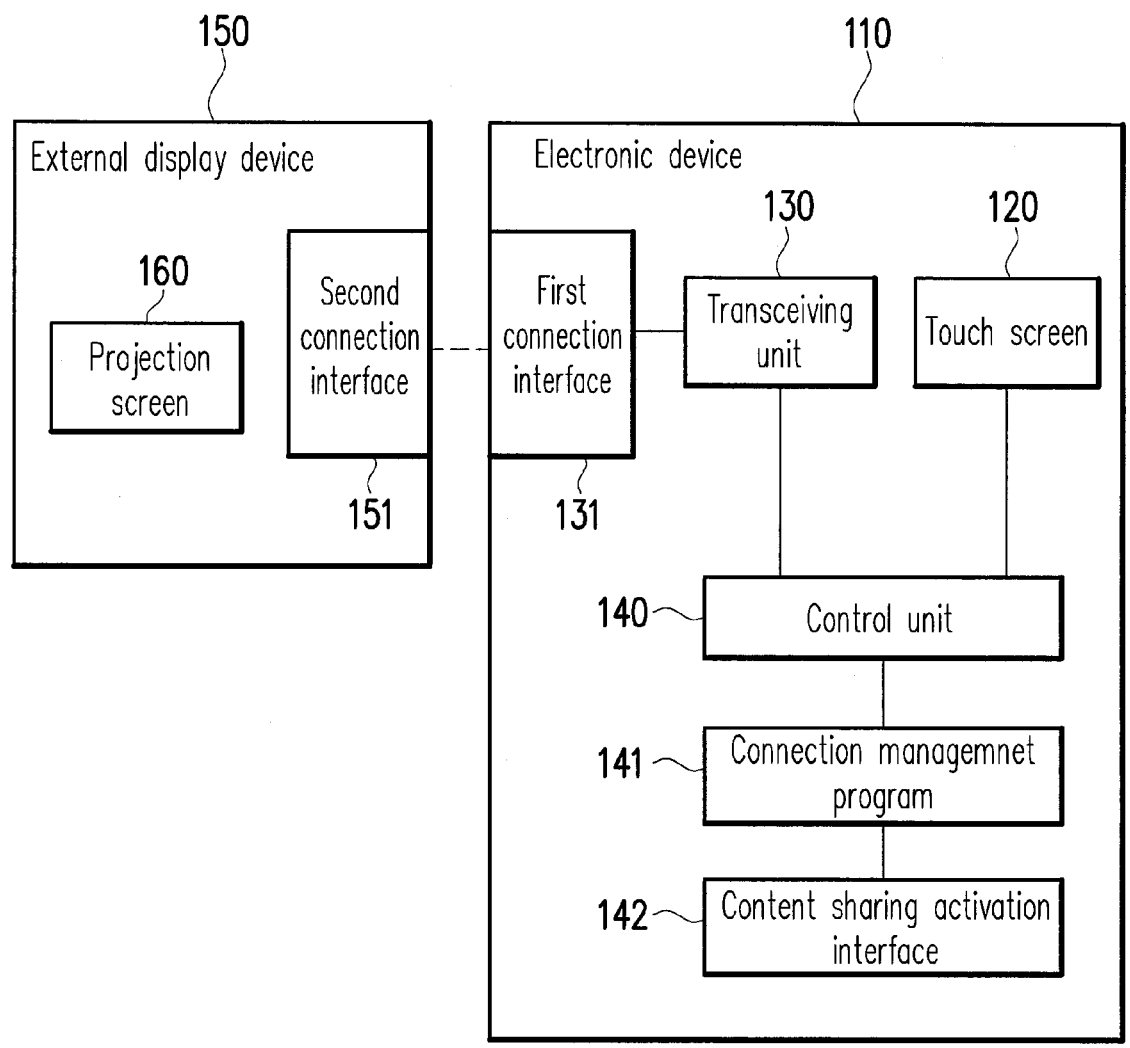
FIG. 1 is a functional block diagram of an electronic device and an external display device according to an embodiment of the invention.

FIG. 1 is a functional block diagram of an electronic device and an external display device according to an embodiment of the invention. An electronic device 110 may be a device having a touch screen (such as a touch screen 120 depicted in FIG. 1) such as a cellular phone, a smart phone, a tablet computer or a notebook computer. An external display device 150 may be a television apparatus or a projection apparatus, having a display or a projection screen (such as a projection screen 160 depicted in FIG. 1) with a size larger than the touch screen 120.

In the present embodiment, the electronic device 100 includes a touch screen 120, a transceiving unit 130, a control unit 140 and a connection management program 141. The touch screen 120 may be a resistive touch screen or a capacitive touch screen, but the invention is not limited thereto. The electronic device 110 includes a first connection interface 131 which could be wired or wirelessly connected to a second connection interface 151 of the external display device 150. Accordingly, the transceiving unit 130 is a communication element electrically connected to the first connection interface 131 and supporting a wired connection or a wireless connection. In addition, the control unit 140 can be a functional module implemented by hardware and/or software, in which the hardware can be a hardware element with computing capability such as a CPU, a chip set, a microprocessor, or a combination of the above; and the software can be an operating system or a driver and so on. The control unit 140 is a master control element providing processes of the screen content sharing method of the invention, which can be configured to execute the connection management program 141 as to implement the invention. In an embodiment of the invention, the electronic device 110 includes work modes respectively corresponding to the connection status (the connection is completed/fail or lost) between the electronic device 110 and the external display device 150. In this embodiment, the work modes of the electronic device 110 includes an ordinary touch screen mode, a touch screen projection mode and a touch pad projection mode, and these work modes of the electronic device 110 will be described as follows.

Figure 2:
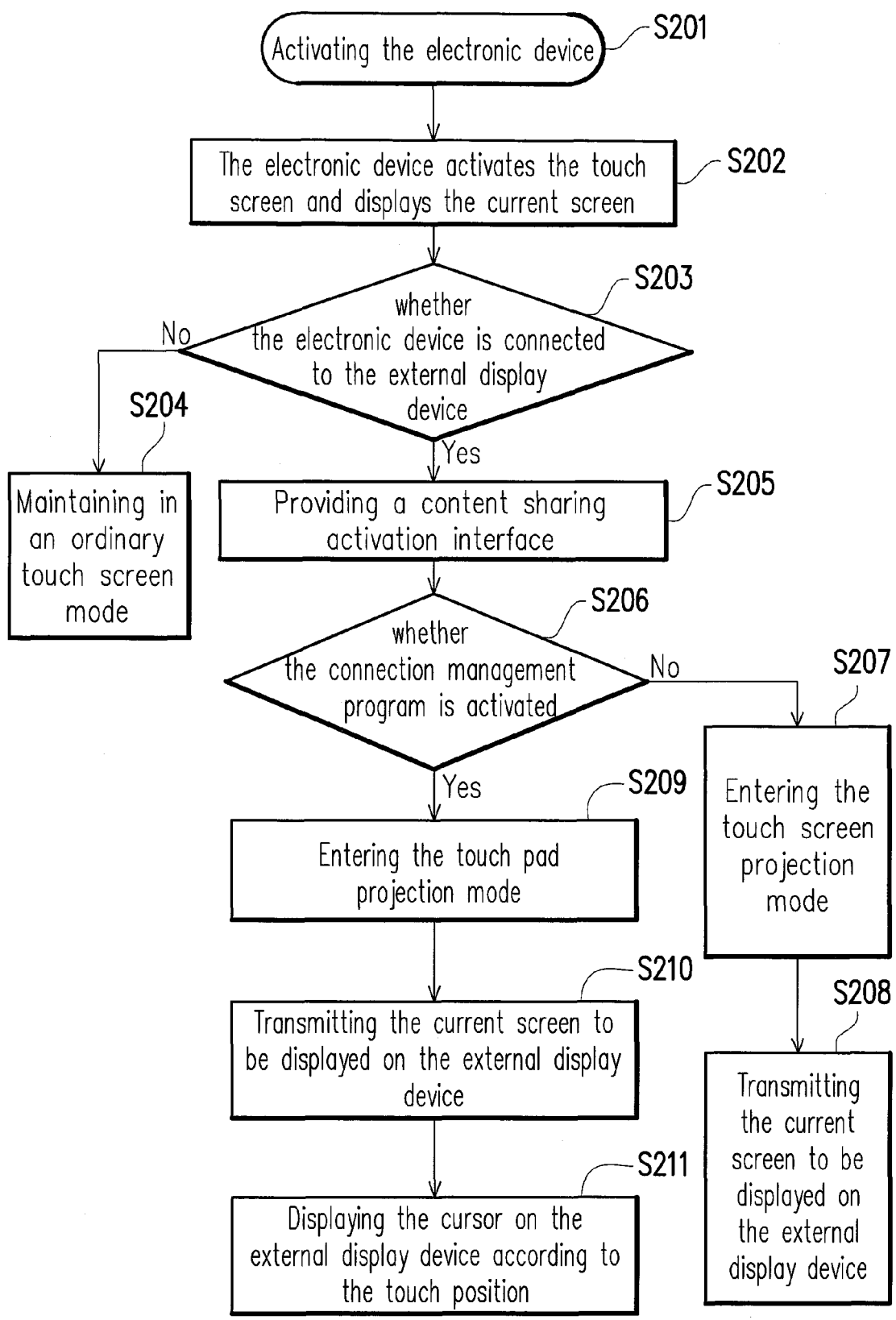
FIG. 2 is a flowchart of a screen content sharing method according to an embodiment of the invention.

FIG. 2 is a flowchart of a screen content sharing method according to an embodiment of the invention. Referring to FIG. 1 and FIG. 2 together, first, the electronic device 110 is activated under an operation of a user (step S201). The touch screen 120 of the electronic device 110 is activated after the electronic device 110 is activated, and a current screen is displayed on the touch screen 120 (step S202). Afterwards, the electronic device 110 determines whether there is a connection to an external display device (e.g., the external display device 150) through the first connection interface 131 (step S203). If not, the electronic device 110 maintains in the ordinary touch screen mode which simply displays the current screen on the touch screen 120 for the user to perform clicking operation with (step S204).

When the electronic device 110 determines that the connection is made to the external display device 150 through the first connection interface 131, the electronic device 110 then provides a content sharing activation interface 142 (step S205). For instance, one or more software button(s) can be provided as the content sharing activation interface 142. The software button(s) being stored with information of asking whether the user wishes to activate content sharing. When the user wishes to activate the screen content sharing, it can be done by touching the software button on the touch screen 120. The content sharing activation interface 142 can also be a physical button provided on the electronic device 110. In this case, in step S205, the electronic device 110 enables operating ability of the physical button. When the user wishes to activate the screen content sharing, it can be done by directly touching the physical button.

Next, the electronic device 110 determines whether the connection management program 141 is activated (step S206). Ways for activating the connection management program 141 may vary based on configurations in practical implementation. For example, after the user has clicked the content sharing activation interface 142 on the touch screen 120, the content sharing activation interface 142 may again display another software button for the user to select whether to activate the connection management program 141. Once the user clicked on the software button representing "activation", the connection management program 141 is activated, accordingly. Alternatively, in another embodiment of the invention, when the electronic device 110 determines that the connection to the external display device 150 through the first connection interface 131 is completed (step S203), the connection management program 141 is then automatically activated, such that there is no need to display the content sharing activation interface 142 in this embodiment.

When the electronic device 110 determines that the connection management program is not activated, the electronic device 110 then enters the touch screen projection mode (step S207), which simply transmits the current screen to be displayed on the projection screen 160 of the external display device 150 (step S208).

When the connection management program 141 is activated, the electronic device 110 then enters the touch pad projection mode (step S209). When the electronic device 110 enters the touch pad projection mode, not only does the electronic device 110 transmit the current screen to the external display device 150 to be displayed on the projection screen 160 (step S210), but the connection management program 141 further determines a touch position of a touch action on the touch screen 120 according to the touch action (e.g., the user clicking the touch screen) received by the touch screen 120. Next, the touch position is converted into a cursor to be transmitted to the external display device 150, so that the cursor can be synchronously displayed together with the current screen on the projection screen 160 (step S211).

It should be noted that, the touch action on the touch screen can include a plurality of touch modes in which relations between defined gesture touch modes and actions executed by the screen element can be set by the connection management program 141. For example, the touch mode on the touch screen 120 can be a single finger mode, wherein in the singer mode, a touch on the touch screen 120 is utilized by a single finger, and the touch position of the single finger is a projection position of the cursor on the current screen displayed by the projection screen 160. When the electronic device 110 enters the touch pad projecting mode, the user can determine, directly from the cursor, whether the user's finger touched on the touch screen 120 is on a correct position of the current screen displayed by the projection screen 160. In other words, the user's eye sight may stay on the projection screen 160 of the external display device 150 without going back and forth between the external display device 150 and the electronic device 110, so as to enhance convenience in use.

In addition, the touch mode of the touch action on the touch screen 120 further includes a two fingers mode. In the two fingers mode, a sliding action executed on the touch screen 120 is utilized by two fingers, and the sliding action is a screen dragging with respect to the current screen displayed on the projection screen 160. For instance, it is assumed that the user intends to display a photo file stored in the electronic device 110 to the external display device for one-by-one browsing. The user may use the two fingers to execute the sliding action on the touch screen 120, and the sliding action is to drag the photos one by one with respect to the current screen displayed on the projection screen 160. This allows the user to operate more intuitively, without having eye sight going back and forth between the external display device 150 and the electronic device 110.

In addition, when electronic device 110 enters the touch pad projection mode, the user may browse and click simply with eye sight stayed on the projection screen 160 of the external display device 150, thus according to an embodiment of the invention, a power-saving mechanism can be further provided on the electronic device 110. When the electronic device 110 enters the touch pad projection mode, the control unit 140 of the electronic device 110 can control the touch screen 120 to turn off backlight and/or stop displaying any content on the touch screen 120. That is, the current screen is stopped to be displayed on the touch screen 120, however, the user may still perform touch controls on the touch screen 120 since the touch function is not turned off. If required, the user may turn on the backlight and displaying ability of the touch screen 120 again by clicking on a position on the touch screen which corresponding to the software button of the content sharing interface 142 displayed on the projection screen 160 (or the physical button provided on the electronic device 110). Furthermore, when the connection between the electronic device 110 and the external display device is lost (i.e., the connection between the first connection interface 131 and the second connection interface 151 is lost), or the user operates the electronic device 110 to exit the touch pad projection mode (e.g., when clicking on the software button on of the content sharing activation interface 142 to turn off the touch pad projection mode), the power-saving mode is then turned off so the control unit 140 may turn the backlight and the displaying ability of the touch screen 120 back on.

In summary, a wireless or a wired projection may be utilized when the user controls the electronic device 110 (e.g., a cellular phone or a tablet computer) to enter the touch pad projection mode, that is, projecting a content displayed on the cellular phone or the tablet computer (i.e. the electronic device 110 in the embodiment of the invention) to the television apparatus (i.e., the external display device 150 in the embodiment of the invention). A wired connection can be utilized by, for example, a physical connection cables, and a wireless connection can be utilized by, for example, a WiFi Display (WiDi) connection. Accordingly, by applying the electronic device (e.g. the electronic device 110 in FIG. 1) and the screen content sharing method proposed in the invention, the user may keep eye sight on the television apparatus (or big screen being projected). The user may also confirm options clicked or objects dragged on the screen of the cellular phone (or the tablet computer) from the television apparatus without switching position of eye sight repeatedly between the television the cellular phone (or the tablet computer).

In view of above, the invention provides an electronic device and a screen content sharing method, allowing the user to project the content of the electronic device on hand to the big screen of the external display device, so that the user only needs to have eyes focused on the big screen of the external display device while clicking the touch screen of the electronic device so as to correspondingly click on options on the big screen without changing sight between the electronic device and the external display device. On the other hand, in most of conventional projection technologies, only current screen of the electronic device on hand is faithfully projected to the big screen. The invention is capable of adding a cursor corresponding to the touch position to the current screen (which does not include the cursor originally) of the cellular phone or the tablet computer when being projected, so as to significantly enhance convenience in use for the user.

It will be apparent to those skilled in the art that various modifications and variations can be made to the structure of the disclosed embodiments without departing from the scope or spirit of the disclosure. In view of the foregoing, it is intended that the disclosure cover modifications and variations of this specification provided they fall within the scope of the following claims and their equivalents.

What is claimed is:

1. An electronic device for sharing a screen content to an external display device, comprising:
   a touch screen to display a current screen;
   a first connection interface connected to a second connection interface of the external display device;
   a transceiving unit electrically connected to the first connection interface; and
   a control unit coupled to the transceiving unit and the touch screen, and configured to determine a touch position and a touch mode of a touch action currently on the touch screen and a work mode of the electronic device respectively according to the touch action being received by the touch screen and a connection status between the first connection interface and the second connection interface;
   wherein, the control unit is further configured to execute a connection management program in which the electronic device enables the work mode into a touch pad projection mode when the connection between the first connection interface and the second connection interface is completed and the connection management program is executed by the control unit; and in the touch pad projection mode, the control unit transmits the current screen to the external display device through the transceiving unit so as to display the current screen on a projection screen of the external display device, and projects a cursor to be displayed on the current screen to the projection screen of the external display device according to the touch position;
   wherein the control unit controls the touch screen to enter a power-saving mode when the electronic device is controlled by the control unit to enable the work mode into the touch pad projection mode, wherein in the power-saving mode, the current screen is not displayed on the touch screen while touch functions of the touch screen remains workable; and
   wherein the control unit provides a software button to be displayed on the projection screen, the control unit controls the touch screen to exit the power-saving mode when a click action is performed on a position of the touch screen which is corresponding to the software button displayed on the projection screen.

2. The electronic device of claim 1, wherein:
   the control unit provides a software button as a content sharing activation interface to be displayed on the touch screen when the control unit determines that the connection between the first connection interface and the second connection interface is completed; and
   the control unit controls the electronic device to enable the work mode into the touch pad projection mode when the control unit receives the touch action corresponding to the content sharing action interface from the touch screen.

3. The electronic device of claim 1, wherein:
   the electronic device provides a physical button as a content sharing activation interface;
   the control unit enables the physical button to receive an operation signal when the control unit determines that the connection between the first connection interface and the second connection interface is completed; and
   the control unit controls the electronic device to enable the work mode into the touch pad projection mode when the control unit receives the operation signal.

4. The electronic device of claim 1, wherein:
   the control unit controls the electronic device to enable the work mode into a touch screen projection mode when the connection between the first connection interface and the second connection interface is completed but the connection management program is not activated and executed,
   wherein, in the touch screen projection mode, the control unit transmits the current screen to the external display device through the transceiving unit so as to display the current screen.

5. The electronic device of claim 1, wherein:
   the control unit automatically activates and executes the connection management program when the control unit determines that the connection between the first connection interface and the second connection interface is completed.

6. The electronic device of claim 1, wherein:
   the touch mode of the touch action on the touch screen comprising a single finger mode, wherein in the single finger mode and when the electronic device is in the touch pad projection mode, a touch on the touch screen is utilized by a single finger, and the touch position of the single finger is a projection position of the cursor on the current screen displayed by the external display device.

7. The electronic device of claim 1, wherein:
   the touch mode of the touch action on the touch screen comprising a two fingers mode, wherein in the two finger mode and when the electronic device is in the touch pad projection mode, a sliding action on the touch screen is utilized by two fingers, and the sliding action is a screen dragging with respect to the current screen displayed on the external display device.

8. The electronic device of claim 1, wherein:
   the control units controls the electronic device to enable the work mode into an ordinary touch screen mode when the control unit determines that the connection between the electronic device and the external display device is failed or lost,
   wherein the control unit only displays the current screen on the touch screen in the ordinary touch screen mode.

9. The electronic device of claim 1, wherein:
   the control unit turns off the power-saving mode when the electronic device exits the touch pad projection mode, so the current screen is displayed on the touch screen.

10. The electronic device of claim 1, wherein the first connection interface of the electronic device and the second connection of the external display device are wired connected or wirelessly connected.

11. A screen content sharing method for sharing a screen content between an electronic device and an external display device, wherein the electronic device includes a touch screen, and the screen content sharing method comprises:
    displaying a current screen on a touch screen;
    determining a work mode of the electronic device according to a connection status between the electronic device and the external display device;
    determining a touch position and a touch mode of a touch action on the touch screen according to the touch action received by the touch screen;
    controlling the electronic device to enable the work mode into a touch pad projection mode if a connection between the electronic device and the external display device is completed and a connection management program is executed;

transmitting the current screen to the external display device so as to display the current screen on a projection screen of the external display device when the connection management program is executed, and projecting a cursor on the current screen to the projection screen of the external display device according to the touch position;

controlling the touch screen to enter a power-saving mode when controlling the electronic device to enable the work mode into the touch pad projection mode, wherein in the power-saving mode, the current screen is not displayed on the touch screen while touch functions of the touch screen remains workable; and providing a software button to be displayed on the projection screen to turn off the power-saving mode when a click action is performed on a position of the touch screen which is corresponding to the software button displayed on the projection screen, so the current screen is displayed back on the touch screen.

12. The screen content sharing method of claim 11, wherein before the connection management program is executed, the screen content sharing method further comprises:

providing a content sharing activation interface to be displayed on the touch screen when it is determined that the connection between the electronic device and the external display device is completed; and controlling the electronic device to enable the work mode into the touch pad projection mode when the touch action corresponding to the content sharing action interface is received from the touch screen.

13. The screen content sharing method of claim 11, wherein before the connection management program is executed, the screen content sharing method further comprises:

providing a physical button as a content sharing activation interface;

enabling the physical button to receive an operation signal when determining the connection between the electronic device and the external display device is completed;

controlling the electronic device to enable the work mode into the touch pad projection mode when the operation signal is received.

14. The screen content sharing method of claims 11, further comprising:

controlling the electronic device to enable the work mode into a touch screen projection mode when the connection between the electronic device and the external display device is completed but the connection management program is not activated and executed, wherein, in the touch screen projection mode, the current screen is transmitted to the external display device so as to display the current screen on the projection screen.

15. The screen content sharing method of claim 11, wherein before the connection management program is executed, the screen content sharing method further comprises:

automatically activating and executing the connection management program when determining that the connection between the electronic device and the external device is completed.

16. The screen content sharing method of claim 11, wherein the touch mode of the touch action on the touch screen comprising a single finger mode, wherein in the single finger mode and when the electronic device is in the touch pad projection mode, a touch on the touch screen is utilized by a single finger, and the touch position of the single finger is a projection position of the cursor on the current screen displayed by the external display device.

17. The screen content sharing method of claim 11, wherein the touch mode of the touch action on the touch screen comprising a two fingers mode, wherein in the two finger mode and when the electronic device is in the touch pad projection mode, a sliding action on the touch screen is utilized by two fingers, and the sliding action is a screen dragging with respect to the current screen displayed on the projection screen.

18. The electronic device of claim 11, wherein:

turning off the power-saving mode when the electronic device exits the touch pad projection mode, so the current screen is displayed back on the touch screen.

19. The screen content sharing method of claim 11, further comprising:

controlling the electronic device to enable the work mode into an ordinary touch screen mode when determining the connection between the electronic device and the external display device is failed or lost;

wherein the current screen is only displayed on the touch screen in the ordinary touch screen mode.

20. The screen content sharing method of claim 11, wherein the electronic device and the external display device are wired connected or wirelessly connected.

* * * * *